United States Patent
Fukunaga et al.

(10) Patent No.: US 11,037,379 B2
(45) Date of Patent: Jun. 15, 2021

(54) RESOURCE REPLENISHMENT SYSTEM AND WORK VEHICLE

(71) Applicant: Kubota Corporation, Osaka (JP)

(72) Inventors: Tomofumi Fukunaga, Sakai (JP); Keishiro Nishi, Sakai (JP); Atsushi Shinkai, Sakai (JP); Yushi Matsuzaki, Sakai (JP)

(73) Assignee: Kubota Corporation, Osaka (JP)

( * ) Notice: Subject to any disclaimer, the term of this patent is extended or adjusted under 35 U.S.C. 154(b) by 142 days.

(21) Appl. No.: 16/088,540

(22) PCT Filed: Dec. 6, 2016

(86) PCT No.: PCT/JP2016/086175
§ 371 (c)(1),
(2) Date: Sep. 26, 2018

(87) PCT Pub. No.: WO2017/195395
PCT Pub. Date: Nov. 16, 2017

(65) Prior Publication Data
US 2019/0122454 A1 Apr. 25, 2019

(30) Foreign Application Priority Data

May 9, 2016 (JP) .............................. JP2016-093994

(51) Int. Cl.
*G07C 5/08* (2006.01)
*G09B 29/10* (2006.01)
(Continued)

(52) U.S. Cl.
CPC .............. *G07C 5/08* (2013.01); *A01B 69/008* (2013.01); *A01B 76/00* (2013.01); *A01B 79/005* (2013.01);
(Continued)

(58) Field of Classification Search
CPC ......... G07C 5/08; A01B 69/008; A01B 76/00; A01B 79/005; B60K 15/03;
(Continued)

(56) References Cited

U.S. PATENT DOCUMENTS 4,462,079 A * 7/1984 Ito ............................ G07C 5/10
340/684
7,856,290 B2 * 12/2010 Kumhyr .................. B60L 53/16
700/248
(Continued)

FOREIGN PATENT DOCUMENTS

JP 2006322235 A 11/2006
JP 2009293404 A 12/2009
(Continued)

*Primary Examiner* — Yazan A Soofi
*Assistant Examiner* — Naeem Taslim Alam
(74) *Attorney, Agent, or Firm* — The Webb Law Firm (57) ABSTRACT

Resource consumption of a work vehicle in a specified work site is estimated more appropriately and a resource replenishment timing is calculated appropriately. A resource replenishing system for a work vehicle that effects work-implementing travel in a work site while consuming an amount of resource supplied from an energy source pack mounted on its vehicle body includes a consumption amount recording section 62 for recording an actual unit consumption amount of the resource together with work contents as work history, a work plan management section 52 for managing work plan information containing the work contents, an estimated consumption amount calculation section 101 for calculating an estimated unit consumption amount of the resource consumed per unit work amount of the work vehicle implemented based on the work plan information, with reference to the work history, and a replenishment management section 60 for calculating a replenishment
(Continued)

timing for replenishing the resource to the energy source pack, based on the estimated unit consumption amount.

9 Claims, 4 Drawing Sheets

(51) Int. Cl.
| | | |
|---|---|---|
| *A01B 76/00* | (2006.01) | |
| *B60K 15/03* | (2006.01) | |
| *G08G 1/00* | (2006.01) | |
| *G06Q 50/02* | (2012.01) | |
| *A01B 79/00* | (2006.01) | |
| *G06Q 10/04* | (2012.01) | |
| *F02D 29/00* | (2006.01) | |
| *A01B 69/04* | (2006.01) | |
| *G06Q 10/06* | (2012.01) | |
| *F02D 29/02* | (2006.01) | |
| *G09B 29/00* | (2006.01) | |
| *G08G 1/09* | (2006.01) | |

(52) U.S. Cl.
CPC .............. *B60K 15/03* (2013.01); *F02D 29/00* (2013.01); *F02D 29/02* (2013.01); *G06Q 10/047* (2013.01); *G06Q 10/06* (2013.01); *G06Q 10/06313* (2013.01); *G06Q 50/02* (2013.01); *G08G 1/00* (2013.01); *G08G 1/09* (2013.01); *G09B 29/00* (2013.01); *G09B 29/10* (2013.01); *B60K 2015/03217* (2013.01)

(58) Field of Classification Search
CPC ........... B60K 2015/03217; F02D 29/00; F02D 29/02; G06Q 10/047; G06Q 10/06; G06Q 10/06313; G06Q 50/02; G08G 1/00; G08G 1/09; G09B 29/00; G09B 29/10
See application file for complete search history.

(56) References Cited

U.S. PATENT DOCUMENTS

| | | | |
|---|---|---|---|
| 10,480,442 B2 * | 11/2019 | Sato ..................... | G07C 5/0841 |
| 2008/0234888 A1 * | 9/2008 | Zanardelli ............ | H04L 67/125 |
| | | | 701/34.2 |
| 2009/0157289 A1 * | 6/2009 | Graessley ......... | G01C 21/3682 |
| | | | 701/123 |
| 2011/0060521 A1 * | 3/2011 | Watkins ............. | G01C 21/3697 |
| | | | 701/469 |
| 2013/0144519 A1 | 6/2013 | Nakano et al. | |
| 2014/0214311 A1 | 7/2014 | Stevens et al. | |
| 2014/0257911 A1 * | 9/2014 | Anderson ........ | G06Q 10/06315 |
| | | | 705/7.25 |
| 2014/0303814 A1 | 10/2014 | Burema et al. | |
| 2014/0330460 A1 * | 11/2014 | Schoonmaker .......... | B60L 9/00 |
| | | | 701/19 |
| 2015/0051825 A1 * | 2/2015 | Saavedra ............... | B60K 35/00 |
| | | | 701/123 |
| 2015/0266482 A1 * | 9/2015 | Quix ....................... | G07C 5/00 |
| | | | 701/123 |
| 2015/0319913 A1 | 11/2015 | Foster et al. | |
| 2016/0091338 A1 * | 3/2016 | Abuelsaad ......... | G01C 21/3469 |
| | | | 701/538 |

FOREIGN PATENT DOCUMENTS

| | | |
|---|---|---|
| JP | 201467309 A | 4/2014 |
| JP | 201648461 A | 4/2016 |
| WO | 2011035427 A1 | 3/2011 |
| WO | 2014160589 A1 | 10/2014 |
| WO | 2015077452 A1 | 5/2015 |

* cited by examiner

RESOURCE REPLENISHMENT SYSTEM AND WORK VEHICLE

CROSS-REFERENCE TO RELATED APPLICATIONS

This application is the United States national phase of International Application No. PCT/JP2016/086175 filed Dec. 6, 2016, and claims priority to Japanese Patent Application No. 2016-093994 filed May 9, 2016, the disclosures of which are hereby incorporated in their entirety by reference.

TECHNICAL FIELD

The present invention relates to a resource replenishing system for a work vehicle that effects work-implementing travel (traveling while implementing a utility work) in a work site while consuming an amount of resource supplied from an energy source pack mounted on its vehicle body. The invention relates also to a work vehicle to be built in such resource replenishing system.

BACKGROUND ART

Such work vehicle configured to effect work-implementing travel in a work site while consuming an amount of resource supplied from an energy source pack mounted on its vehicle body will be stuck in the middle of the work in a work site, with occurrence of exhaustion of fuel or battery electric power. So, a replenishing timing for the energy source pack such as fuel, battery electric power is important. According to an agricultural machine (a combine) disclosed in Patent Document 1, at time of arrival at a work target field, reference is made to work data stored in a work performance information database for comparing a fuel used amount which will be consumed if the work is implemented in this work target field and a current remaining fuel amount, thus determining a fuel replenishing timing. That is, upon arrival at the work target field, fuel used amount which will be consumed if the work is implemented in this work target field and a current remaining fuel amount are compared with each other. Based on this comparison, before a work is implemented in this work field, there will be determined a fuel replenishing timing such as replenishing fuel before the work is implemented in the work field, or replenishing fuel after completion of the work, or no replenishing fuel at all, etc.

BACKGROUND ART DOCUMENT

Patent Document

Patent Document 1; Japanese Unexamined Patent Application Publication No. 2016-048461

SUMMARY OF THE INVENTION

Problem to be Solved by Invention

With the agricultural machine according to Patent Document 1, it is possible to determine whether to replenish fuel or not, before a work is implemented in a work site (field). However, in the case of a large work site (field), a large amount of fuel is needed for completing a work in the entire work site, so there is high possibility of taking a secure choice of effecting fuel replenishment for the present anyway. Further, in such large work site, there is a desire to know at what stage in the course of the work fuel replenishment will become necessary. Moreover, although fuel consumption varies according to a ground surface condition of the work site or the weather of the work site, etc., it is still important to calculate the timing of fuel replenishment as accurately as possible and also to effect fuel replenishment in a flexible manner according to the circumstances. In order to meet such demand, comparison between a standard fuel use amount and a current fuel remaining amount alone will not be sufficient; instead, more fine or detailed estimation of fuel consumption amount (resource consumption) is needed. Incidentally, such problem as above will occur similarly in estimation of battery electric power consumption (resource consumption) in an electrically driven vehicle driven by battery power.

In view of the above-described state of the art, there is a need for a technique that allows more appropriate estimation of resource consumption and appropriate calculation of resource replenishment timing in a predetermined work site for a work vehicle that effects work-implementing travel while consuming an amount of resource supplied from an energy source pack mounted on its vehicle body.

Solution

A resource replenishing system according to the present invention for a work vehicle that effects work-implementing travel in a work site while consuming an amount of resource supplied from an energy source pack mounted on its vehicle body, comprises:

a consumption amount recording section for recording an actual unit consumption amount of the resource together with work contents as work history;

a work plan management section for managing work plan information containing the work contents in the work site;

an estimated consumption amount calculation section for calculating an estimated unit consumption amount of the resource consumed per unit work amount of the work vehicle implemented based on the work plan information, with reference to the work history; and a replenishment management section for calculating a replenishment timing for replenishing the resource to the energy source pack, based on the estimated unit consumption amount.

Incidentally, the "energy source pack" is a collective name used herein for those storing energy source needed for a work-implementing travel of a work vehicle, which particularly is a fuel tank in the case of a work vehicle using fuel such as gasoline or is a battery pack in the case of an electrically driven work vehicle using an electric motor.

With such system configuration as above, based on work plan information, a consumption amount of resource (gasoline or battery electric power) per unit work amount in a site designated as a subject of work by the work vehicle, namely, an estimated unit consumption amount, will be calculated with reference to an actual unit consumption amount recorded as work history for this work site. As this actual unit consumption amount is recorded in the consumption amount recording section together with its work contents, it is possible to calculate an estimated unit consumption amount with taking the work contents into consideration, with reference to the actual unit consumption amount. Thus, even for a same kind of work in a same work site, performance of previously implemented work in which work load and/or traveling load was (were) different is put into consideration, so that an appropriate estimation of resource consumption amount per unit work amount is made possible. After the calculation of such estimated unit consumption amount, a resource consumption situation in the work-implementing travel in this work site can be calculated with reference to the work plan information. Thus, based on this, the replenishment management section can calculate a replenishment timing for the energy source pack.

According to one preferred embodiment of the present invention, the replenishment management section is configured to calculate a resource replenishment amount in addition to the replenishment timing. With this arrangement, it becomes possible to inform a replenishment amount needed for replenishment of the resource at the replenishment timing. As a result, an appropriate replenishment amount of resource can be prepared at a replenishment location, so that efficiency of resource replenishment work is improved.

Since the estimated unit consumption amount has been calculated based on actual past performance recorded as work history, it will have a certain error relative to a resource amount to be consumed at an actual work, depending on a condition of the work site of the day of work (ground surface condition, condition of harvested produce in the case of a harvesting work, etc.) and/or a condition of the work vehicle (maintenance condition, etc.). Therefore, according to one preferred embodiment of the present invention, the system further comprises:

an actual unit consumption amount calculation section for calculating an actual unit consumption amount which is a consumption amount of the resource for the unit work amount at the time of actual work-implementing travel of the work vehicle; and wherein the replenishment management section is configured to correct the replenishment timing based on the actual unit consumption amount.

Since the actual unit consumption amount which was obtained in the course of an actual work represents the condition of the work site and/or the condition of the work vehicle of the day, and since the estimated unit consumption amount is corrected based on such actual unit consumption amount, the replenishment timing calculated with such correction is more accurate. Incidentally, the actual unit consumption amount is based only on the resource consumption amount up to a midpoint of the work. Accordingly, considering that a work site condition differs between the work started area and an area to be worked from now on, it will be more advantageous to calculate the replenishment timing from the estimated unit consumption amount and the actual unit consumption amount, with using e.g. a weighted calculation technique than calculation of the replenishment timing from the actual unit consumption amount alone.

In case the calculation of the replenishment timing of this resource replenishment system is effected with the proviso that the energy source pack is currently full with a known amount of resource, it will not be needed to grasp a remaining amount of the energy source pack. However, if such condition of the energy source pack being full at the time of calculation of the replenishment timing is not satisfied, then, such resource remaining amount will become needed for the calculation of the replenishment timing. In general, a work vehicle is equipped with a remaining amount detection section for detecting a remaining amount of the energy source pack. Therefore, in the resource replenishment timing at time of actual work, preferably, the replenishment timing will be calculated with combining a remaining amount detected by the remaining amount detection section with the estimated unit consumption amount or the actual unit consumption amount. For this reason, according to one preferred embodiment of the present invention, the system further comprises a remaining amount detection section for calculating a remaining amount of the energy source pack and the replenishment management section corrects the replenishment timing based on a remaining amount detected by the remaining amount detection section.

The replenishment timing does not represent the timing when the energy source pack becomes empty, but a timing when there is only a very small amount of resource remaining in the energy source pack. So, even after the replenishment timing has been passed, a traveling for a short distance for the purpose of resource replenishment is still possible. Therefore, in case a work for one work site is almost completed. it will be more efficient if the resource replenishment is effected after completion of the work in this work site. Further, in case a plurality of kinds of work are to be effected in a vast work site, if the replenishment timing is adjusted so that the resource replenishment is effected at an appropriate break between works, the work efficiency will be improved. For this reason, according to one preferred embodiment of the present invention, the system further comprises a progress degree calculation section for calculating a progress degree of a land work in the work site; and the replenishment management section is configured to correct the replenishment timing based on a progress degree calculated by the progress degree calculation section.

In case the resource is replenished based on a replenishment timing, a location where the resource replenishment is to be effected will become an issue. A resource replenishing vehicle such a fuel tank vehicle or a battery mounted vehicle capable of supplying resource to the energy source pack needs to stand by at a predetermined location on a road in the periphery of the work site or a predetermined location within the work site. And, such a location suitable for resource replenishment will differ for each work site. For this reason, according to one preferred embodiment of the present invention, the system further comprises:

a work site information storage section for storing work site information including map information of the work site; and a replenishment location determination section for determining a location for the resource replenishment at the replenishment timing based on the work site information.

As the resource replenishment location is determined with reference to map information of the work site, replenishment at an appropriate location will become possible even when the driver is not familiar with the map situation of the work site. In particular, in case the work vehicle can obtain a self-vehicle location by using a satellite positioning technique, it is also possible to guide the work vehicle to the target resource replenishment location.

In order to inform the replenishment timing and/or the replenishment location to an operator riding on the work vehicle or an operator who monitors the work vehicle in the periphery of the work vehicle, it is important to provide an informing section for informing the replenishment timing and/or the replenishment location to the operator. This informing can be effected via a speaker or a display mounted on the work vehicle. Or, it can be effected also via a speaker or a display of a communication terminal carried by the operator of the work vehicle.

The present invention is applicable also to a work vehicle built in the resource replenishment system described above. Such work vehicle comprises:

a vehicle body mounting a utility implement for effecting a work in a work site while traveling therein;

an energy source pack mounted on the vehicle body;

a traveling drive device that drives with using resource supplied from the energy source pack;

a work plan management section for managing work plan information containing work contents in the work site for each work site;

a consumption amount recording section for recording an actual unit consumption amount of the resource which was calculated in a past work-implementing travel together with the work contents as work history; and a replenishment management section for calculating a replenishment timing for the energy source pack in the work site, with using an estimated unit consumption amount to be consumed for the work in the work site, which is calculated based on the work plan information and the work history.

With this work vehicle too, after an estimated unit consumption amount is calculated, a consumption situation of resource in the traveling in the work site can be calculated with reference to the work plan information. Thus, based on this, the replenishment management section can calculate a replenishment timing for the energy source pack. And, based on this calculated replenishment timing, the driver can make a work-implementing travel plan. Further, if such replenishment timing is calculated during an actual work-implementing travel also, the work vehicle can be replenished with resource in a reliable manner at a location suitable for fuel replenishment, without forgetting of replenishment. Incidentally, preferably, the consumption amount recording section is divided into a dedicated consumption amount recording section disposed on the work vehicle side and a shared consumption amount recording section disposed on the side of a management computer which manages the work vehicle. With this arrangement, at the management computer, it is possible to statistically process a large amount of data indicating actual unit consumption amounts collected in works either by a same work vehicle or by different work vehicles in various respective work sites. As a result, the estimated unit consumption amount can be calculated even more accurately, in accordance with various work conditions.

EMBODIMENTS

Before explaining specific embodiments of a resource replenishment system and a work vehicle according to the present invention, there will be explained a basic flow of information in this resource replenishment system with reference to FIG. 1. Here, it is assumed that the work vehicle which effects a utility work while traveling in a work site is configured as a vehicle which utilizes power of an internal combustion engine for driving a traveling drive device and a utility implement and the vehicle mounts a fuel tank as an "energy source pack" therefor.

The work vehicle carries out a work (utility work) while traveling in the work site and consumes an amount of fuel by its work-implementing travel. From a work-implementing traveling distance of the work vehicle or a work amount of the work vehicle and also from a consumption amount of the fuel at that time (a fuel decrease amount in the fuel tank), an actual unit consumption amount is obtained. This actual unit consumption amount can be a fuel consumption amount per unit traveling distance of the work vehicle or a fuel consumption amount per unit work amount (a cultivation area, a harvest amount, a seedling planting amount, etc.).

Figure 1:
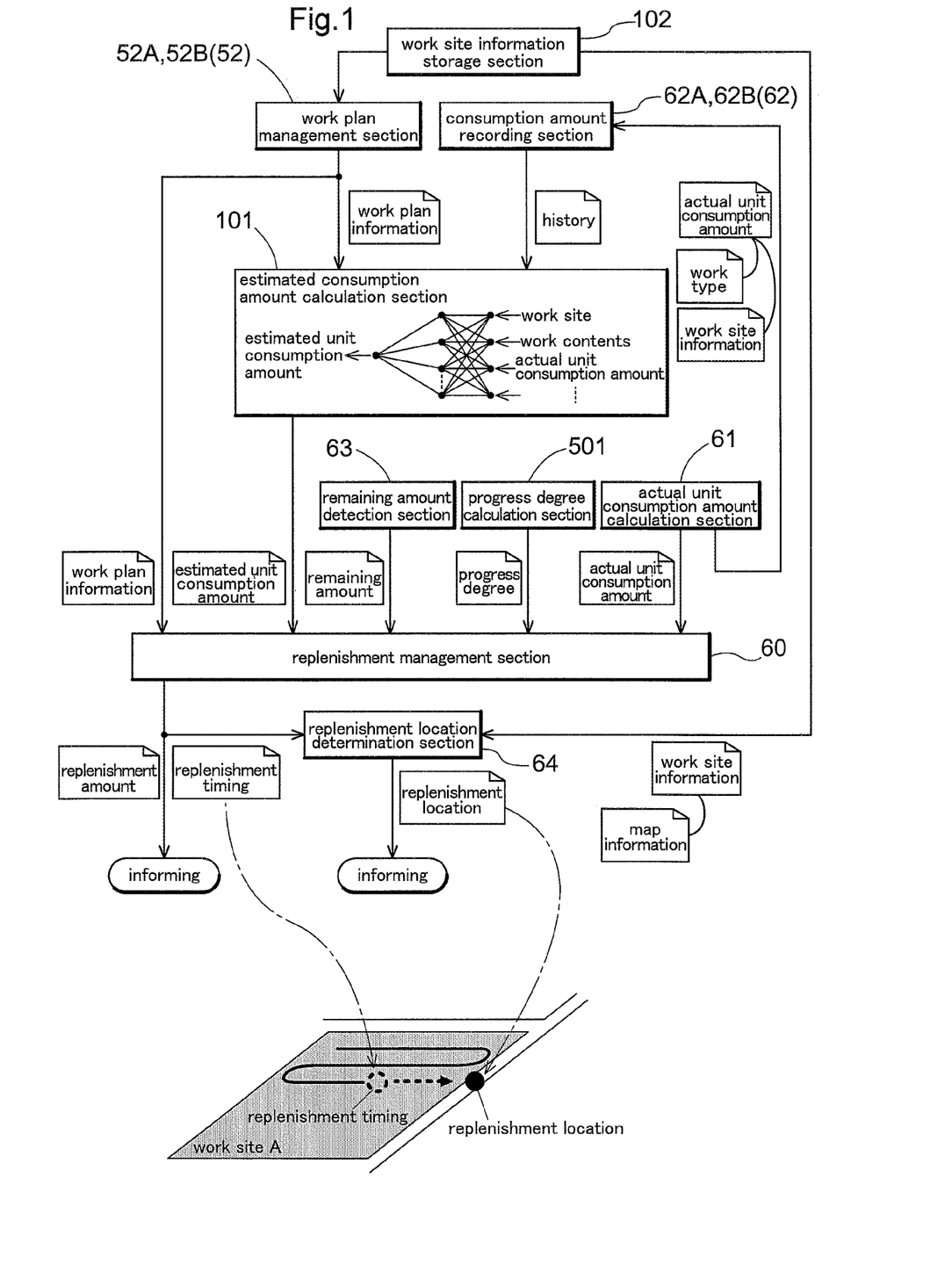
FIG. 1 is an explanatory view illustrating basic flow of information in a resource replenishment system according to the present invention.

In the example illustrated in FIG. 1, an actual unit consumption amount calculation section 61 calculates a fuel consumption amount during traveling from a detection result (fuel remaining amount) of a remaining amount detection section 63 configured to detect a fuel remaining amount in the fuel tank. The actual unit consumption amount calculated by the actual unit consumption amount calculation section 61 is recorded as a work history together with work contents which include a work-implementing traveling distance of the work vehicle, a work amount of the work vehicle as well as work type, work site information, etc. Recording of this work history in real time is effected for a "memory" mounted on the work vehicle. The work history recorded in this memory is recorded also in a management computer installed in a remote management center by a batch processing or online processing. Accordingly, a consumption amount recording section 62 for recording the work history including the actual unit consumption amount is divided into a consumption amount recording section 62A provided on the work vehicle side and a consumption amount recording section 62B provided on the management computer side. Needless to say, the consumption amount recording section 62 can be provided on one side only.

In the consumption amount recording section 62, upon each implementation of a work by the work vehicle in a registered work site, an actual unit consumption amount together with its work contents will be recorded as a work history, so this consumption amount recording section 62 functions as a "database" for storing a work history for each work site and a work history for each work vehicle.

The utility work by the work vehicle in each work site is managed by a work plan management section 52. This work plan management section 52 obtains a location, an area of the work site to be worked on and contents of work that have been implemented so far, from the work site information stored in a work site information storage section 102 and generates work plan information as information relating to a work to be implemented. Further, the work plan management section 52 manages the work plan information for each work site, so this section 52 can provide the work contents at the time of work.

An estimated consumption amount calculation section 101 calculates an estimated unit consumption amount which is an amount of fuel consumed per unit work amount of the work vehicle to be implemented based on this work plan information, by referring to the work history recorded in the consumption amount recording section 62. This estimated unit consumption amount is calculated, based on the work history for the work type in the work site designated by the work plan information. In case the same work was implemented previously for one or more times in the same work site, and the work history thereof is recorded in the consumption amount recording section 62, the estimated unit consumption amount will be calculated based on the recorded actual unit consumption amount, with taking an environment data such as one provided by a weather forecast into consideration also. On the other hand, in case work history relating to the same work type in the same work site is not recorded, i.e. not available, in the consumption amount recording section 62, a work history relating to a similar work site or a similar work type will be extracted from the consumption amount recording section 62 and then, based on this extracted data, an estimated unit consumption amount will be calculated. Parameters (input data) for use in the calculation of the estimated unit consumption amount include e.g. traveling characteristics of the work site, the type of work vehicle, the actual unit consumption amount, the environment data, etc. By adding an appropriate "weight" to each parameter, an estimated unit consumption amount for a work in a planned work site will be derived. In case there are a plurality of planned work sites, an estimated unit consumption amount for each work site as well as an estimated unit consumption amount for traveling (movements) between work sites will be calculated.

After calculation of the estimated unit consumption amount, based on this estimated unit consumption amount, a replenishment management section 60 calculates a fuel replenishment timing for the work in the planned work site. For instance, such replenishment timing will be provided at a predetermined work-implementing traveling distance or a predetermined traveling period in the work-implementing travel in the work site, at which distance or period exhaustion of the fuel remaining in the fuel tank is expected to occur. Namely, prior to implementation of an actual work, by calculation of this replenishment timing, it becomes possible to estimate at what location or time fuel shortage will occur or at what location or time fuel shortage will not occur prior to completion of the contemplated work. Since the replenishment timing is calculated under a work vehicle condition when the fuel remaining amount of the fuel tank becomes a predetermined amount, it is possible to calculate also a maximum amount of fuel that can be replenished at that time, based on the capacity of the fuel tank. Consequently, the replenishment management section 60 can calculate an appropriate amount of fuel replenished at the replenishment timing, together with calculating the replenishment timing. Thus, an appropriate replenishment amount of fuel for replenishment can be prepared in advance. And, since the amount of fuel needed for replenishment and the time when the replenishment is necessary can also be known in advance, an appropriate fuel replenishment plan can be formulated.

Further, in case the map information of the work site as the work site information can be obtained from the work site information storage section 102, it is possible to provide additionally a replenishment location determination section 64 for determining a fuel replenishment location suitable for fuel replenishment based on the replenishment timing. This fuel replenishment location is a location where the work vehicle will stand by and also where a fuel transporting vehicle (a fuel replenishment container) will arrive or stand by. Needless to say, such fuel replenishment location can be a nearby gas station also.

In this way, according to the present resource replenishment system, prior to actual implementation of a planned work in a work site, the estimated unit consumption amount is used for calculating a fuel replenishment timing and for calculating also, if needed or desired, a replenishment amount. Therefore, a fuel replenishment plan can be made in advance and preparation of a fuel transporting vehicle or a fuel replenishment container based on this plan is possible also.

In the case of the example illustrated in FIG. 1, after the actual work is started in the work site, from an actual remaining fuel amount of the fuel tank detected by the remaining amount detection section 63, the actual unit consumption amount calculation section 61 calculates an actual unit consumption amount. And, this actual unit consumption amount is recorded together with work contents as a work history in the consumption amount recording section 62A. Further, this work history recorded in the consumption amount recording section 62A is also recorded in the consumption amount recording section 62B at the management center by a batch processing or an online processing. The work history in the consumption amount recording section 62B is utilized for calculation of an estimated consumption amount for subsequent work planning.

After the actual work has been started, in order to calculate a replenishment timing for prompting fuel replenishment, the replenishment management section 60 can take into consideration the actual unit consumption amount calculated during the work. If it is found that the estimated unit consumption amount and the actual unit consumption amount are not in agreement, the replenishment timing will be corrected in advance by using this actual unit consumption amount, whereby more accurate replenishment timing can be calculated. Similarly, based on the remaining amount detected by the remaining amount detection section 63, it is possible to correct directly not only the replenishment timing, but also a replenishment amount.

Also, since fuel replenishment involves interruption of the work, advantageously the fuel replenishment should be effected at such a timing that allows smooth interruption of the work process. For this reason, in case there is provided a progress degree calculation section 501 for calculating a progress degree of currently implemented work, the replenishment timing and the replenishment amount will be corrected based on the calculated progress degree.

The work vehicle used in the explanation of FIG. 1 is a vehicle using an internal combustion engine as its driving source, so this vehicle includes a fuel tank as an "energy source pack". On the other hand, in case the work vehicle is an electrically driven vehicle, a battery pack will correspond to its "energy source pack". Thus, in that case, the resource to be consumed and replenished will consist solely of electric power (battery charge amount). So, all of the functional sections shown in FIG. 1 can be used as they are.

Figure 2:
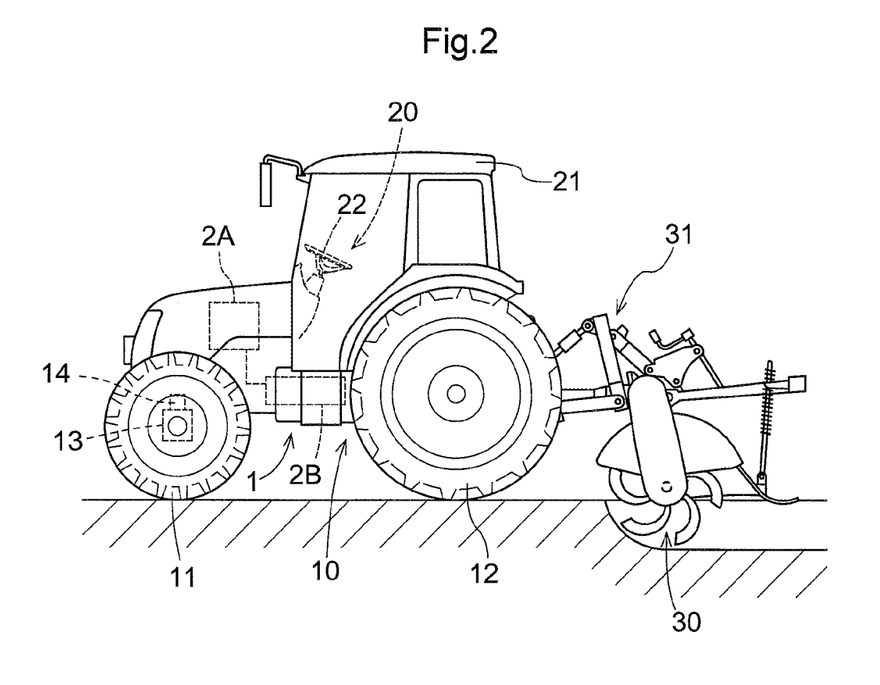
FIG. 2 is a side view of a tractor showing one embodiment of a work vehicle.

Next, one specific embodiment of a work vehicle relating to the present invention will be explained. In this embodiment, the work vehicle, as shown in FIG. 2, comprises a tractor mounting an implement 30 such as a rotary plow for carrying out an agricultural work such as a cultivating work on a field (work site) delimited by ridges or the like. In this tractor, a maneuvering section 20 is provided at a center portion of a vehicle body 1 which is supported by front wheels 11 and rear wheels 12 constituting a traveling mechanism 10. The traveling mechanism 10 includes a transmission including a speed changer unit, in addition to the front wheels 11 and the rear wheels 12. The vehicle body 1 mounts an engine 2A as a driving source and mounts also, as an energy source pack, a fuel tank 2B for supplying fuel to the engine 2A. At a rear portion of the vehicle body 1, there is mounted the implement 30 which in this case is a rotary plow, via a hydraulic lift mechanism 31. The front wheels 11 function as steering wheels and by changing their steering angle, a traveling direction of the tractor is changed. The steering angle of the front wheels 11 is changed by an operation on a steering mechanism 13. This steering mechanism 13 includes a steering motor 14 for automatic steering. At time of manual traveling, steering of the front wheels 11 by an operation on a steering wheel 22 disposed at the maneuvering section 20 will be made possible. At a cabin 21 of the tractor, there is provided a satellite positioning module 80 constituted of a GNSS (Global Navigation Satellite System) module or the like. Though not shown, a satellite antenna for receiving GPS signals or GNSS signals is mounted to a ceiling area of the cabin 21. Incidentally, the satellite positioning module 80 can include an inertial navigation module incorporating a gyro acceleration sensor, a geomagnetic direction sensor, etc. in order to assist the satellite navigation. Needless to say, the inertial navigation module can be provided at a site different from the satellite positioning module 80.

Figure 3:
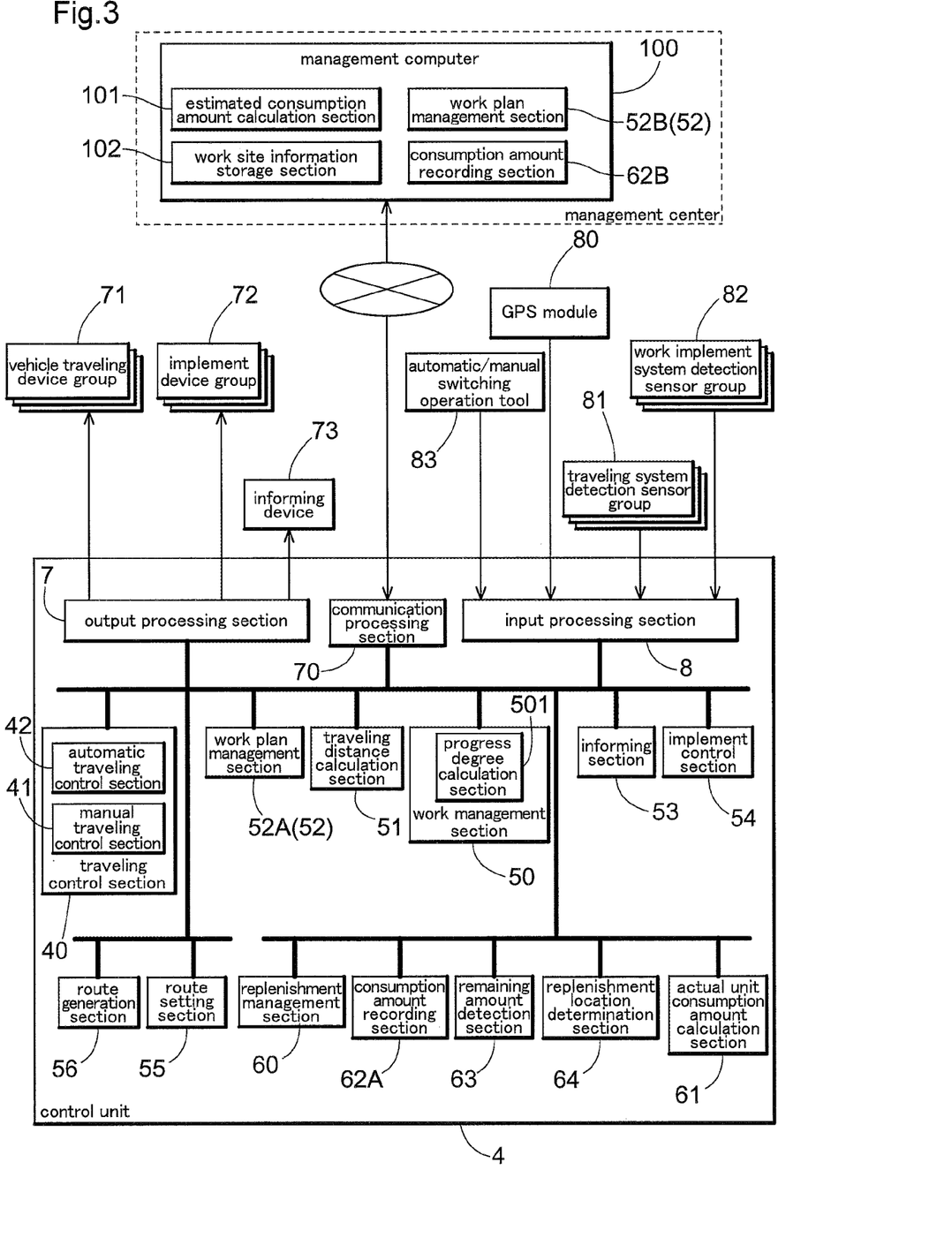
FIG. 3 is a functional block diagram showing a control system of the tractor.

FIG. 3 shows a control system built in this tractor. This control system employs the basic principle which was explained above with reference to FIG. 1. A control unit 4 which is the core component of this control system includes an output processing section 7, an input processing section 8 and a communication processing section 70, which function as input/output interfaces. The output processing section 7 is connected to a vehicle traveling device group 71, an implement device group 72, an informing device 73, etc. Though not shown, the vehicle traveling device group 71 includes, in addition to the steering motor 14 and the engine 2A, devices to be controlled for vehicle traveling such as a speed changer mechanism. The implement device group 72 includes a driving mechanism for the implement 30, the lift mechanism 31 for lifting up/down the implement 30, etc. The communication processing section 70 has functions of transmitting data processed by the control unit 4 to the management computer 100 built at the remote management center and receiving various data from the management computer 100. The informing device 73 includes a flat display panel, a lamp, a buzzer and informs a driver or an operator of various kinds of information desired to be informed to the driver or operator such as a traveling alarm, a deviation from target in an automatic steering traveling, in visual or audible form. Signal transmission between the informing device 73 and the output processing section 7 is effected in either wired or wireless manner.

The input processing section 8 is connected to the satellite positioning module 80, a traveling system detection sensor group 81, a work implement system detection sensor group 82, an automatic/manual switching operation tool 83, etc. The traveling system detection sensor group 81 includes sensors for detecting traveling states such as an engine rotational speed, a speed change state, etc., a remaining fuel sensor of the fuel tank 2B, and so on. The work implement system detection sensor group 82 includes sensors for detecting a position or a tilting of the implement 30, a sensor for detecting work load, etc. The automatic/manual switching operation tool 83 is a switch for selecting either an automatic traveling mode for traveling by automatic steering or a manual steering mode for traveling by the manual steering. For instance, if the automatic/manual switching operation tool 83 is operated during traveling in the automatic steering mode, switchover is made to traveling by the manual steering. Conversely, if the automatic/manual switching operation tool 83 is operated during traveling in the manual steering mode, switchover is made to traveling by the automatic steering.

The control unit 4 include those functional sections described above with reference to FIG. 1, namely, the traveling control section 40, the traveling distance calculation section 51, the vehicle side work plan management section 52A (an example of "work plan management section 52"), and the work management section 50. For controlling the implement 30, an implement control section 54 is provided. This tractor is capable of traveling under both automatic traveling (automatic steering) and manual traveling (manual steering). Therefore, the traveling control section 40 includes a manual traveling control section 41 as well as an automatic traveling control section 42. In this automatic traveling, the vehicle travels along a preset target traveling route, so there is provided a route setting section 55 for setting such target traveling route.

Production of the target traveling route is done by the control unit 4 and/or the management computer 100. In case the generation of the target traveling route is done in the control unit 4, this control unit 4 will be equipped with a route generation section 56 having a route generation algorithm. Whereas, in case the generation of the target traveling route is done in the management computer 100, generated target traveling route will be sent from the management computer 100 to the control unit 4 and set by the route setting section 55. The automatic traveling control section 42 calculates any direction error and position error (direction/position deviation) between the target traveling route and the self-vehicle position and generates an automatic steering instruction and outputs this to the steering motor 14 via the output processing section 7. Both the manual traveling control section 41 and the automatic traveling control section 42 together constituting the traveling control section 40 can provide a constant vehicle speed instruction for commanding the vehicle body 1 to travel at a constant vehicle speed via the traveling mechanism 10. With this, in either the automatic traveling or the manual traveling, a constant speed vehicle traveling for traveling with automatically maintaining a constant vehicle speed (or, a different vehicle speed may be employed for straight traveling and turning traveling) is possible.

The work management section 50 has a function of making comparison between a work plan managed by the work plan management section 52A and an actual work performance. For instance, progress degree in real time of work is calculated by the progress degree calculation section 501. Respective kinds of items managed by the work management section 50, e.g. such information as a fuel consumption condition, the work progress degree, direction and position deviations at the time of automatic traveling, etc. will be given to the informing section 53 to be eventually informed via the informing device 73 and informing data will be produced.

The replenishment management section 60, the actual unit consumption amount calculation section 61, the remaining amount detection section 63 and the replenishment location determination section 64 constitute the functional section group described above with reference to FIG. 1, deal with information relating to fuel replenishment, and are built into the control unit 4. The actual unit consumption amount calculated by the actual unit consumption amount calculation section 61 and information processed by other functional section group during a work will be recorded temporarily as "work history" in the consumption amount recording section 62A. And, this work history recorded in the consumption amount recording section 62A will be transmitted to the management computer 100 at the management center in the batch manner or in the on-line manner, and will be recorded in its consumption amount recording section 62B to be utilized for calculation of an estimated consumption amount in a subsequent work plan. Incidentally, the information relating to the work site and the tractor managed by the work management section 50 and information relating to work result will also be forwarded, when needed, to the management computer 100 by a batch processing or an on-line processing.

In the instant embodiment, the management computer 100 incorporates therein the estimated consumption amount calculation section 101, the work site information storage section 102, the work plan management section 52B and the consumption amount recording section 62B which were explained above with reference to FIG. 1. The work plan management section 52B is the work plan management section 52 on the management computer 100 side. This section 52B formulates a plan of works (a cultivation work, a planting work, a fertilization work, a harvesting work, etc.) for a plurality of fields into data and outputs these data as "work plan information", thus assists farm management planning by a farming household or entity. Based on such work plan information outputted by the work plan management section 52B, the estimated consumption amount calculation section 101 will read out the field information (work site information) included in this work plan and the work history recorded in the consumption amount recording section 62B. Then, with reference thereto, this section 101 will estimate an amount of fuel to be consumed by this tractor in this work and output this as an "estimated unit consumption amount". Namely, in the instant embodiment, work plan information and estimated unit consumption amount are generated on the management computer 100 side and these will be sent from the management computer 100 to the replenishment management section 60 built in the control unit 4 on the tractor side. Incidentally, the replenishment management section 60 is provided also with (informed also of) the rated capacity of the fuel tank 2B since a replenishment amount is to be calculated in addition to the replenishment timing.

Figure 4:
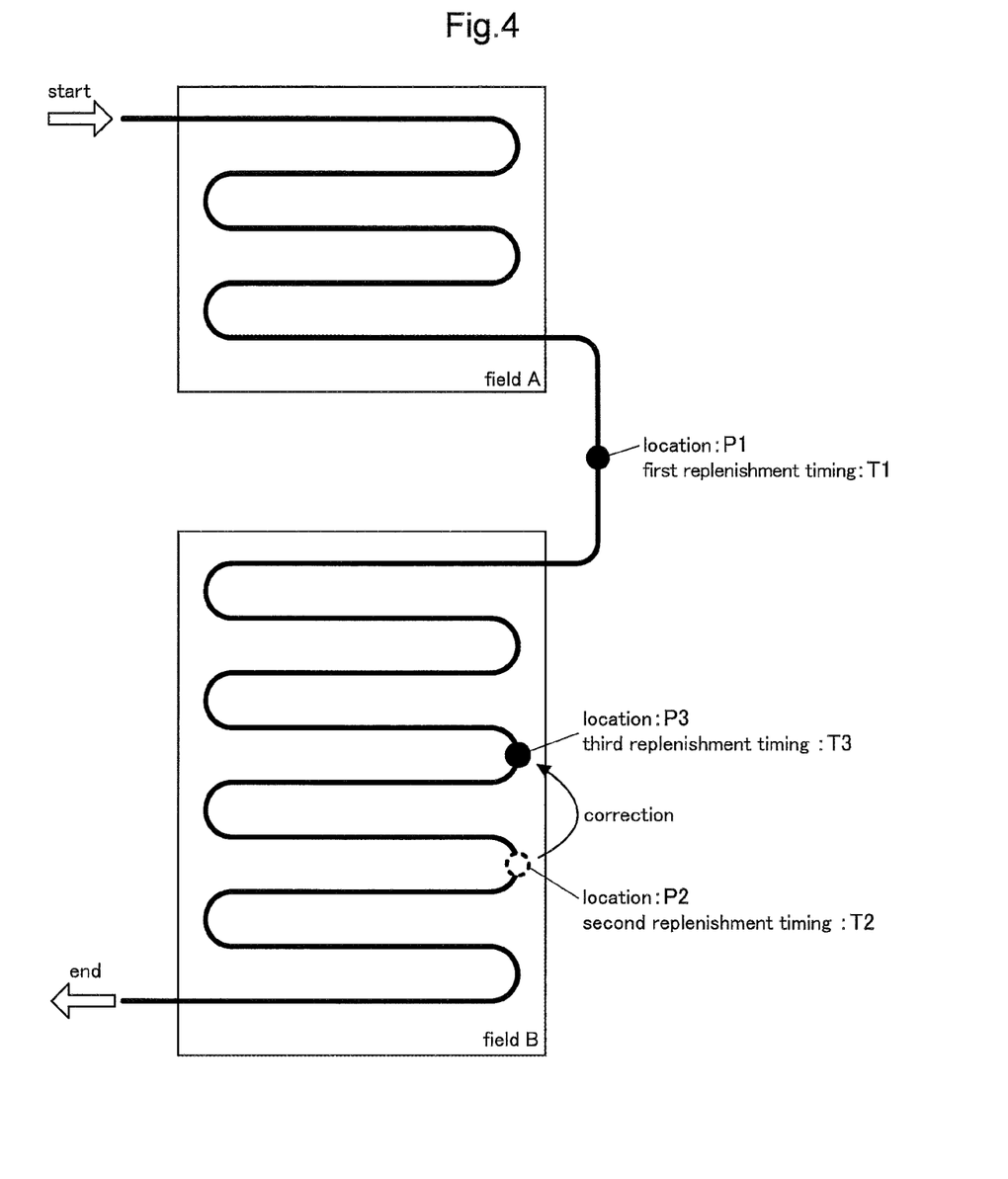
FIG. 4 is an explanatory view in the form of a timing chart showing flow of control for calculating a replenishment timing for the work vehicle.

Next, with reference to FIG. 4, an example of fuel replenishment processing based on this fuel replenishment system in a cultivation work plan using the tractor will be explained briefly. In this cultivation work, a cultivation work is to be effected by the tractor on a field A and a field B. In this, the tractor will be self-propelled for traveling between the field A and the field B also.

(Work Plan Process)

Work histories of tractor's cultivation works in the field A and the field B will be extracted from the consumption amount recording section 62B, then estimated unit consumption amounts in the field A and the field B respectively will be calculated. Further, estimated unit consumption amounts for movements to the field A and to the field B respectively will be calculated also. These calculated estimated unit consumption amounts will be sent, together with the cultivation work plan information of these cultivation works, to the replenishment management section 60 built in the tractor control unit 4. Then, based on these received cultivation work plan information and the estimated unit consumption amounts, the replenishment management section 60 will calculate an optimal replenishment timing and an optimal replenishment amount of fuel replenishment. In the example shown in FIG. 4, it is forecasted that a first replenishment timing: T1 will occur at a location: P1 in the course of movement from the field A to the field B after completion of cultivation work in the field A. Further, it is also forecasted that a second replenishment timing: T2 will occur at a location: P2 in the course of cultivation work in the field B. Therefore, there will be formulated a fuel replenishment plan for preparing a replenishment vehicle or replenishment container having an amount of replenishment fuel needed at the location: P1 before the time the tractor is expected arrive at the location: P1 and also for preparing such replenishment vehicle or replenishment container having an amount of replenishment fuel needed at the location: P2 before the time the tractor is expected arrive at the location: P2.

(Actual Work Process)

After start of the actual cultivation work in the field A, an actual unit consumption amount is calculated by the actual unit consumption amount calculation section 61. If a difference between the actual unit consumption amount and the estimated unit consumption exceeds a allowable range, then, the replenishment management section 60 built in the tractor control unit 4 will correct the replenishment timing based on this difference. In the example shown in FIG. 4, the first replenishment timing: T1 is not changed, but the second replenishment timing: T2 is changed to a third replenishment timing: T3. Accordingly, in actual, since fuel needs to be replenished at a location: P3 where the third replenishment timing: T3 occurs, the second replenishment timing: T2 is now cancelled and newly at the timing of calculation of the third replenishment timing: T3, the fuel replenishment plan will be changed and informing about such change of fuel replenishment plan including the replenishment amount needed at the third replenishment timing: T3 will be effected.

Such change of fuel replenishment plan, namely, correction of replenishment timing, will be effected, based also on the remaining amount detected by the remaining amount detection section 63. In case the planned replenishment has not been effected, fuel shortage will occur earlier than expected. Such corrections of the replenishment timing and the replenishment amount based on the remaining fuel amount will be useful.

In the instant embodiment, the replenishment management section 60 is built in the control unit 4 of the tractor. Instead, the replenishment management section 60 can be built in the management computer 100. With this, the above-described fuel replenishment plan can be formulated on the management computer side and then transmitted to the replenishment management section 60 built in the control unit 4 of the tractor. This replenishment management section 60 can be built in a communication terminal carried by the operator of the tractor such as a tablet computer, a smart phone, etc. With this, the tractor operator can make a fuel replenishment plan e.g. at home, before driving the tractor and can make an arrangement of sending a replenishment vehicle or a replenishment container to the replenishment location before the time of the replenishment timing.

Other Embodiments (1) In the foregoing embodiment, a tractor mounting a rotary plow as the implement 30 was used as a work vehicle. However, the work vehicle can be embodied as other various kinds of work vehicles such as an agricultural vehicle such as a rice planter, a fertilizer, a combine, or a work vehicle such as a civil engineering vehicle having a dozer, a roller, etc. as the implement 30.

(2) The respective functional sections shown in the functional block diagrams shown in FIGS. 1 and 3 are sectioned for the sake of explanation, mainly. In actual, however, the respective functional sections can be integrated or can be further divided in sub sections, if necessary.

The above-described embodiments are applicable to a work vehicle that effects a ground work while traveling.

DESCRIPTION OF REFERENCE MARKS/NUMERALS

2A: engine
2B: fuel tank (energy source pack)

4: control unit
30: (utility) implement
40: traveling control section
41: manual traveling control section
42: automatic traveling control section
50: work management section
501: progress degree calculation section
51: traveling distance calculation section
52: work plan management section
52A: work plan management section
52B: work plan management section
53: informing section
55: route setting section
56: route generation section
60: replenishment management section
61: actual unit consumption amount calculation section
62: consumption amount recording section
62A: consumption amount recording section
62B: consumption amount recording section
63: remaining amount detection section
64: replenishment location determination section
80: satellite positioning module
100: management computer
101: estimated consumption amount calculation section
102: work site information storage section
105: work subject field

The invention claimed is:

1. A resource replenishing system for a work vehicle that effects work-implementing travel in a work site while consuming an amount of resource supplied from an energy source pack mounted on its vehicle body, the system comprising a control unit programmed or configured to:
  record, by a consumption amount recording section, an actual unit consumption amount of the resource together with work contents as work history;
  manage, by a work plan management section, work plan information containing the work contents in the work site;
  calculate, by an estimated consumption amount calculation section, an estimated unit consumption amount of the resource consumed per unit work amount of the work vehicle implemented based on the work plan information, with reference to the work history;
  calculate, by a replenishment management section, a replenishment timing for replenishing the resource to the energy source pack, based on the estimated unit consumption amount;
  calculate, by an actual unit consumption amount calculation section, an actual unit consumption amount which is a consumption amount of the resource for the unit work amount at a time of actual work-implementing travel of the work vehicle;
  store, by a work site information storage section, work site information including map information of the work site;
  determine, by a replenishment location determination section, a location for the resource replenishment at the replenishment timing based on the work site information; and
  calculate the replenishment timing based on the estimated unit consumption amount prior to an actual implementation of a planned work in the work site and correct the replenishment timing based on the actual unit consumption amount after the actual work is started in the work site, by the replenishment management section.

2. The resource replenishing system of claim 1, wherein the control unit is programmed or configured to calculate, by the replenishment management section, a resource replenishment amount in addition to the replenishment timing.

3. A resource replenishing system for a work vehicle that effects work-implementing travel in a work site while consuming an amount of resource supplied from an energy source pack mounted on its vehicle body, the system comprising a control unit programmed or configured to:
  record, by a consumption amount recording section, an actual unit consumption amount of the resource together with work contents as work history;
  manage, by a work plan management section, work plan information containing the work contents in the work site;
  determine, by an estimated consumption amount calculation section, an estimated unit consumption amount of the resource consumed per unit work amount of the work vehicle implemented based on the work plan information, with reference to the work history;
  determine, by a replenishment management section, a replenishment timing for replenishing the resource to the energy source pack, based on the estimated unit consumption amount;
  detect, by a remaining amount detection section, a remaining amount of the energy source pack;
  store, by a work site information storage section, work site information including map information of the work site;
  determine, by a replenishment location determination section, a location for the resource replenishment at the replenishment timing based on the work site information; and
  calculate the replenishment timing based on the estimated unit consumption amount prior to an actual implementation of a planned work in the work site and correct the replenishment timing based on the remaining amount detected by the remaining amount detection section, by the replenishment management section.

4. The resource replenishing system of claim 1, wherein:
  the control unit is programmed or configured to calculate, by a progress degree calculation section, a progress degree of land work in the work site; and
  the control unit is programmed or configured to correct, by the replenishment management section, the replenishment timing based on the progress degree calculated by the progress degree calculation section.

5. The resource replenishing system of claim 1, wherein the control unit is programmed or configured to inform by an informing section, the replenishment timing and/or the replenishment location.

6. The resource replenishing system of claim 1, further comprising the work vehicle.

7. A work vehicle comprising:
  a vehicle body mounting a utility implement for effecting work in a work site while traveling therein;
  an energy source pack mounted on the vehicle body;
  a traveling drive device that drives using a resource supplied from the energy source pack; and
  a control unit programmed or configured to:
    manage, by a work plan management section, work plan information containing work contents in the work site for each work site;
    record, by a consumption amount recording section, an actual unit consumption amount of the resource which was calculated in a past work-implementing travel together with the work contents as work history;

calculate, by a replenishment management section, a replenishment timing for the energy source pack in the work site, using an estimated unit consumption amount to be consumed for the work in the work site, which is calculated based on the work plan information and the work history;

calculate, by an actual unit consumption amount calculation section, an actual unit consumption amount which is a consumption amount of the resource for the unit work amount at a time of actual work-implementing travel of the work vehicle;

store, by a work site information storage section, work site information including map information of the work site;

determine, by a replenishment location determination section, a location for resource replenishment at the replenishment timing based on the work site information; and calculate the replenishment timing based on the estimated unit consumption amount prior to an actual implementation of a planned work in the work site and correct the replenishment timing based on the actual unit consumption amount after the actual work is started in the work site, by the replenishment management section.

8. The work vehicle of claim 7, wherein the control unit is programmed or configured to calculate, by the replenishment management section, a resource replenishment amount in addition to the replenishment timing.

9. A work vehicle comprising:
a vehicle body mounting a utility implement for effecting work in a work site while traveling therein;
an energy source pack mounted on the vehicle body;
a traveling drive device that drives using a resource supplied from the energy source pack; and
a control unit programmed or configured to:
    manage, by a work plan management section, a work plan information containing work contents in the work site for each work site;
    record, by a consumption amount recording section, an actual unit consumption amount of the resource which was calculated in a past work-implementing travel together with the work contents as work history;
    calculate, by a replenishment management section, a replenishment timing for the energy source pack in the work site using an estimated unit consumption amount to be consumed for the work in the work site, which is calculated based on the work plan information and the work history;
    store, by a work site information storage section, work site information including map information of the work site; and
    determine, by a replenishment location determination section, a location for resource replenishment at the replenishment timing based on the work site information; wherein:
        the control unit is programmed or configured to detect, by a remaining amount detection section, a remaining amount of the energy source pack; and
        the control unit is programmed or configured to calculate the replenishment timing based on the estimated unit consumption amount prior to an actual implementation of a planned work in the work site and to correct the replenishment timing based on the remaining amount detected by the remaining amount detection section after the actual work is started in the work site, by the replenishment management section.

* * * * *

UNITED STATES PATENT AND TRADEMARK OFFICE
CERTIFICATE OF CORRECTION

PATENT NO.        : 11,037,379 B2
APPLICATION NO.   : 16/088540
DATED             : June 15, 2021
INVENTOR(S)       : Tomofumi Fukunaga et al.

It is certified that error appears in the above-identified patent and that said Letters Patent is hereby corrected as shown below:

In the Claims

Column 14, Line 48, Claim 5, delete "inform" and insert -- inform, --

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*